United States Patent [19]
Nayebi et al.

[11] Patent Number: 5,774,185
[45] Date of Patent: Jun. 30, 1998

[54] METHOD OF AND APPARATUS FOR REMOVING EQUALIZING PULSES WITHOUT USING EXTERNAL PINS

[75] Inventors: Mehrdad Nayebi, Palo Alto; Duc Ngo, San Jose; Chun Yee, Sunnyvale, all of Calif.

[73] Assignees: Sony Corporation, Tokyo, Japan; Sony Electronics, Inc., Park Ridge, N.J.

[21] Appl. No.: 583,972

[22] Filed: Jan. 11, 1996

Related U.S. Application Data

[60] Provisional application No. 60/000,408, Jun. 21, 1995.
[51] Int. Cl.$^6$ ...................................................... H04N 5/10
[52] U.S. Cl. ........................... 348/531; 348/530; 348/532
[58] Field of Search ..................................... 348/521–524, 348/525, 529–531, 532, 536, 540; H04N 5/06, 5/10

[56] References Cited

U.S. PATENT DOCUMENTS

| | | | |
|---|---|---|---|
| 3,569,844 | 3/1971 | Lynn | 348/530 |
| 4,064,541 | 12/1977 | Schneider et al. | 348/532 |
| 4,100,575 | 7/1978 | Morio et al. | 358/120 |
| 4,115,800 | 9/1978 | Sakamoto | 358/8 |
| 4,275,420 | 6/1981 | Yamada et al. | 358/167 |
| 4,459,612 | 7/1984 | Shinkai et al. | 358/154 |
| 5,489,946 | 2/1996 | Kommrusch et al. | 348/528 |

*Primary Examiner*—Michael H. Lee
*Attorney, Agent, or Firm*—Haverstock & Owens LLP

[57] ABSTRACT

A circuit for removing every other equalizing pulse from a signal representing the sync pulses of a composite video signal, generates an output signal representative of every horizontal synchronization pulse and every other vertical synchronization pulse within the composite video signal. A sync separator circuit separates the synchronization pulses from the composite video signal. An output of the sync separator circuit includes all of the horizontal synchronization pulses and vertical synchronization pulses. The vertical synchronization pulses include equalizing pulses and serration pulses which have a frequency which is twice the frequency of the horizontal synchronization pulses. A capacitor is used to store charge. A current source charges the capacitor. A transistor controlled by the output signal provides a discharge path for the capacitor. A comparator monitors the voltage level stored across the capacitor and enables an output generation circuit when the level of charge stored across the capacitor is above a predetermined threshold level. The value of the capacitor and the value of the current source cause the time required to raise the voltage level across the capacitor to a level above the predetermined threshold level to be less than the time between horizontal synchronization pulses and greater than the time between vertical synchronization pulses. The output generation circuit generates the output signal as a pulse signal representative of the synchronization pulse. The output generation circuit is only enabled when the voltage level across the capacitor is greater than the predetermined threshold level. Therefore, the pulse signal is generated for every horizontal synchronization pulse and for every other vertical synchronization pulse.

19 Claims, 3 Drawing Sheets

METHOD OF AND APPARATUS FOR REMOVING EQUALIZING PULSES WITHOUT USING EXTERNAL PINS

RELATED APPLICATIONS

This application claims priority under 35 U.S.C. §119(e) of the U.S. provisional application Ser. No. 60/000,408 filed on Jun. 21, 1995 and entitled "Circuitry To Remove Equalizing Pulses Without Using External Pins." The provisional application Ser. No. 60/000,408 filed on Jun. 21, 1995 and entitled "Circuitry To Remove Equalizing Pulses Without Using External Pins" is also hereby incorporated by reference.

FIELD OF THE INVENTION

The present invention relates to the field of separating synchronization pulses from a composite video signal. In particular, the present invention relates to the field of removing every other equalizing pulse from a vertical blanking period of a composite video signal for maintaining horizontal synchronization phase lock.

BACKGROUND OF THE INVENTION

A composite video signal contains information which is used by a video system to generate a video picture on a display, monitor or television. Each period, within the horizontal portion of a composite video signal contains information representing one horizontal output line which is to be output on the video display, monitor or television. Each horizontal period includes a horizontal synchronization pulse, a burst signal and a video information signal. In many video transmission systems, color or chrominance information is represented by a particular phase of the chrominance subcarrier signal that is amplitude modulated with color information. The horizontal synchronization pulse is used by a phase locked loop to synchronize the system for displaying the next horizontal line of video information. The burst signal is used to synchronize the phase of the sampling pulses with the phase of the color subcarrier signal. Separator circuits are utilized to separate the horizontal synchronizing signal and the burst signal from the incoming video signal. The burst signal consists of a sinusoid with a frequency equal to 3.58 MHz, which is the frequency of the chrominance subcarrier $f_{sc}$. The video information signal then comprises the chrominance subcarrier having different phases amplitude-modulated with chrominance information. The composite color video signal includes both luminance and chrominance information.

A video picture or frame is made up of a number of horizontal lines included within the video display. To display a video picture or frame the video system begins at the top of the screen and displays the information within the composite video signal one horizontal line at a time. The information for each horizontal line is contained within a horizontal period of the composite video signal. After each horizontal period, the video system moves to the next line and displays the information within the next horizontal period of the composite video system. This continues until the video system reaches the bottom line on the video display. After displaying the video information on the bottom line of the video display, the video system must reset itself to the top of the display in order to begin displaying the next frame. In order to allow the system to reset itself to the top of the video display a vertical blanking period is included within the composite video signal, after the video information for each frame. This vertical blanking period allows the video system to reset to the top of the video display and begin displaying the information for the horizontal lines of the next frame. Therefore, a number of horizontal periods, enough to comprise a frame or screen, are strung together, within the composite video signal. Between each frame, the composite video signal includes a vertical blanking period which allows the video system to perform a vertical reset and prepare to display the next frame by moving back up to the top of the video display.

During the vertical blanking period the composite video signal includes a first period of equalizing pulses, a period of serration pulses and a second period of equalizing pulses. During this vertical blanking period the video system resets itself to the top of the video display so that it is ready to begin displaying the information for the next frame. However, the video system must be notified of or be able to detect the vertical blanking period so that it can reset itself to the top of the video display. The serration pulses carry synchronization information used by the local vertical oscillator, within the video system, during a vertical reset.

The equalizing and serration pulses during the vertical blanking period are all generated at a frequency equal to twice the frequency of the horizontal synchronizing pulses. A sync separator circuit is used to separate all of the synchronization pulses from the composite video signal including the horizontal, equalizing and serration pulses. However, the sync separator circuit separates the synchronization pulses by comparing their amplitude with respect to the blank level of the signal and therefore has no way of differentiating between horizontal synchronization pulses, equalizing pulses and serration pulses. The output of the sync separator circuit is used by the horizontal phase-locked loop to lock the video system in phase with the composite video signal during the horizontal period of each frame. During the vertical blanking period, the sync separator circuit will output the equalizing and serration pulses which are generated at twice the frequency of the horizontal synchronization pulses. Thus, twice as many synchronization pulses are generated during the vertical blanking period as during the horizontal period. The horizontal phase-locked loop will therefore be unable to remain locked during this period unless something is done to alter the frequency of synchronization pulses during the vertical blanking period. What is needed is a circuit which removes every other synchronization pulse from the output of the sync separator circuit during the vertical blanking period in order to reduce the frequency by half and emulate the frequency of synchronization pulses during the horizontal period. What is further needed is a circuit for removing every other synchronization pulse during the vertical blanking period which does not require the use of external pins of an integrated circuit and an external capacitor.

SUMMARY OF THE INVENTION

A circuit for removing every other equalizing pulse from a signal representing the sync pulses of a composite video signal, generates an output signal representative of every horizontal synchronization pulse and every other vertical synchronization pulse within the composite video signal. A sync separator circuit separates the synchronization pulses from the composite video signal. An output of the sync separator circuit includes all of the horizontal synchronization pulses and vertical synchronization pulses. The vertical synchronization pulses include equalizing pulses and serration pulses which have a frequency which is twice the frequency of the horizontal synchronization pulses. A capacitor is used to store charge. A current source charges the capacitor. A transistor controlled by the output signal provides a discharge path for the capacitor. A comparator monitors the voltage level stored across the capacitor and enables an output generation circuit when the level of charge stored across the capacitor is above a predetermined threshold level. The value of the capacitor and the value of the current source cause the time required to raise the voltage level across the capacitor to a level above the predetermined threshold level to be less than the time between horizontal synchronization pulses and greater than the time between vertical synchronization pulses. The output generation circuit generates the output signal as a pulse signal representative of the synchronization pulse. The output generation circuit is only enabled when the voltage level across the capacitor is greater than the predetermined threshold level. Therefore, the pulse signal is generated for every horizontal synchronization pulse and for every other vertical synchronization pulse.

DETAILED DESCRIPTION OF THE PREFERRED EMBODIMENT

A circuit for removing the equalizing pulses without using external pins of the present invention receives the synchronization pulses of a composite video signal from a sync separator circuit. An output signal is generated which includes all of the horizontal synchronization pulses during a horizontal frame and every other pulse during the vertical blanking period. This output signal is provided to the horizontal phase-locked loop of the video system in order that horizontal phase lock can be maintained during the vertical blanking period. This output signal is also used to generate a horizontal reset signal.

A charging and discharging circuit is used to control a voltage level across a capacitor. The charging and discharging circuit is controlled by a logic circuit through a feedback loop. The voltage level across the capacitor is monitored by a comparator to determine when the voltage level across the capacitor crosses a predetermined threshold value. During time periods when the output signal is at a low level the capacitor is charged by a current source. When the voltage level stored across the capacitor reaches the predetermined threshold level, the output signal will then rise to a high level when the signal from the sync separator circuit rises to a high level. If the signal from the sync separator circuit rises to a high level before the voltage level stored across the capacitor reaches the predetermined threshold level, then the output signal will remain at the low level. The value of the capacitor and the value of the current source used to charge the capacitor have been chosen so that the voltage level stored across the capacitor will reach the predetermined threshold before every horizontal sync pulse but after every other synchronization pulse during the vertical blanking period. In this manner, every other pulse during the vertical blanking period is eliminated from the output signal.

Figure 1:
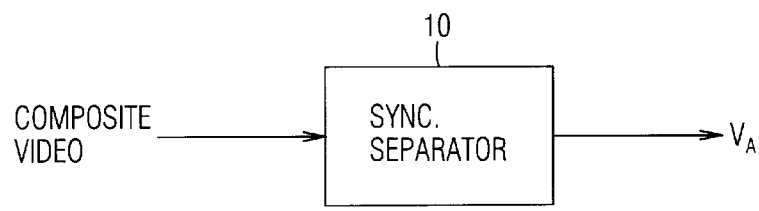
FIG. 1 illustrates a block diagram of a sync separator circuit for separating synchronization pulses from the composite video signal.

A block diagram of a sync separator circuit 10 is illustrated in FIG. 1. An input composite video signal is coupled as an input to the sync separator circuit 10. An output signal VA is provided from the sync separator circuit 10. The output signal VA includes the synchronization pulses from the input composite video signal including the horizontal synchronization pulses and the pulses during the vertical blanking period. The pulses during the vertical blanking period include equalizing pulses and serration pulses. The equalizing pulses and the serration pulses have a frequency which is equal to twice the frequency of the horizontal synchronization pulses.

Figure 2:
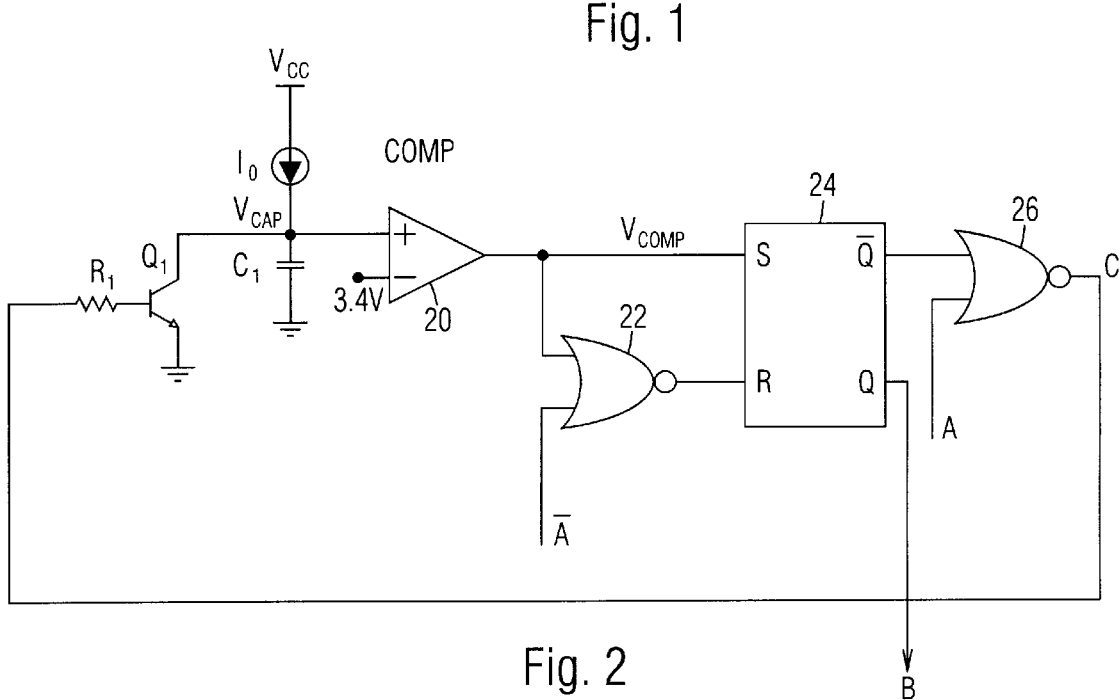
FIG. 2 illustrates a block diagram schematic of a circuit to remove every other equalizing pulse during the vertical blanking period.

A block diagram schematic of a circuit to remove equalizing pulses during the vertical blanking period according to the present invention is illustrated in FIG. 2. The output signal C is provided as a feedback control and coupled to the first terminal of a resistor R1. The second terminal of the resistor R1 is coupled to the base of an npn transistor Q1. The emitter of the transistor Q1 is coupled to ground. The collector of the transistor Q1 is coupled to the first terminal of a capacitor C1, to the first terminal of a current source $I_o$ and to the positive input of a comparator 20, thereby forming a voltage node $V_{camp}$ representative of the voltage level stored across the capacitor C1. The second terminal of the capacitor C1 is coupled to ground. The second terminal of the current source $I_o$ is coupled to a supply voltage VCC. The negative input of the comparator 20 is coupled to a constant voltage level signal equal to 3.4 volts.

An output $V_{Comp}$ of the comparator 20 is coupled as the set input S of an RS latch 24 and as the input to a logical NOR gate 22. The output A from the sync separator circuit 10, illustrated in FIG. 1 is coupled as the input to a logical NOR gate 26. The inverse signal $\overline{A}$ which is the inverse of the output A from the sync separator circuit 10 is coupled as the input to the logical NOR gate 22. The output of the logical NOR gate 22 is coupled as the input R of the RS latch 24. The output Q of the RS latch 24 provides a signal B. The inverse output $\overline{Q}$ of the RS latch 24 is coupled as the input to the logical NOR gate 26. The output of the logical NOR gate 26 provides the output signal C which is the output of the circuit to remove equalizing pulses during a vertical blanking period.

Figure 3:
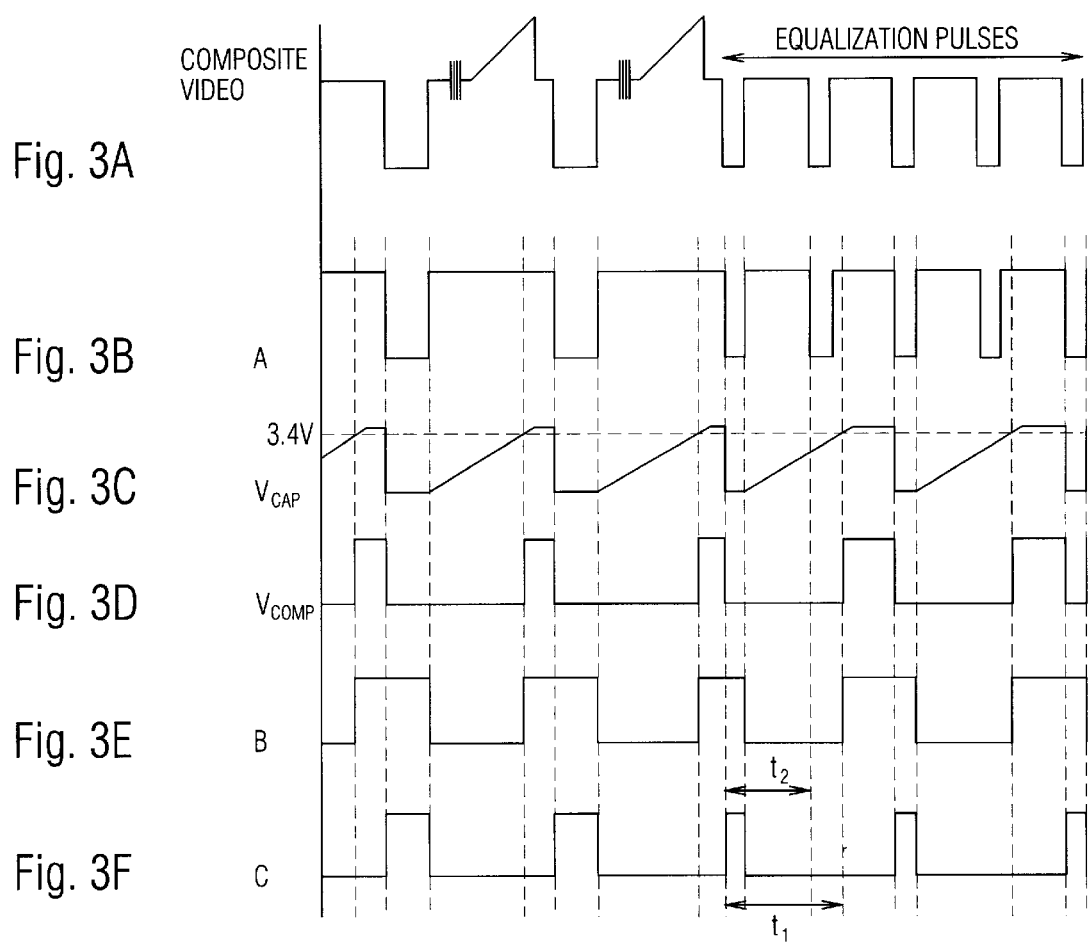
FIG. 3a illustrates a timing diagram of a composite video signal.
FIG. 3b illustrates a timing diagram of an output of the sync separator circuit illustrated in FIG. 1.
FIG. 3c illustrates a timing diagram of a voltage signal $V_{Cap}$ which represents a voltage level stored across a capacitor C1.
FIG. 3d illustrates a timing diagram of an output $V_{Comp}$ of a comparator 20.
FIG. 3e illustrates a timing diagram of a signal B which represents an output Q of an RS latch 24.
FIG. 3f illustrates a timing diagram of an output signal C of the circuit of the present invention.

Timing diagrams of relevant signals within the circuits illustrated in FIGS. 1 and 2 are illustrated in FIG. 3. The composite video signal which is input to the sync separator circuit 10 is illustrated in FIG. 3a. The signal A which is output from the sync separator 10 in response to the composite video signal is illustrated in FIG. 3b. The voltage signal $V_{Cap}$ which represents the voltage level stored across the capacitor C1 is illustrated in FIG. 3c. The output $V_{Comp}$ of the comparator 20 is illustrated in FIG. 3d. The signal B which represents the output Q of the RS latch 24 is illustrated in FIG. 3e. The output signal C which represents the output of the circuit for removing every other equalizing pulse during the vertical blanking period is illustrated in FIG. 3f. The timing diagrams illustrated in FIG. 3 are shown to correspond in time to each other.

The composite video signal illustrated in FIG. 3a includes two horizontal periods followed by five equalization pulses during a vertical blanking period at the end of a frame. The output signal A from the sync separator circuit 10 illustrated in FIG. 3b represents only the synchronization pulses from the composite video signal. The output signal A and the inverse signal $\overline{A}$ are then input to the circuit to remove equalizing pulses during vertical blanking period of the present invention which is illustrated in FIG. 2.

The outputs of the logical NOR gates 22 and 26 are at a logical low voltage level when either of their inputs are at a logical high voltage level. The outputs of the logical NOR gates 22 and 26 are at a logical high voltage level only when both of their inputs are at a logical low voltage level. On the rising edge of the output signal A, when the output signal A transitions from a logical low voltage level to a logical high voltage level, the output signal C will fall to a logical low voltage level, turning off the transistor Q1. When the transistor Q1 is turned off the capacitor C1 is charged by the current source $I_o$. When the voltage level $V_{Cap}$ stored across the capacitor C1 is greater than 3.4 volts, the output $V_{Comp}$ of the comparator 20 will rise to a logical high voltage level. When the output $V_{Comp}$ of the comparator 20 rises to a logical high voltage level, the RS latch 24 is set, causing the output Q to rise to a logical high voltage level and the inverse output $\overline{Q}$ to fall to a logical low voltage level. Because the inverse output $\overline{Q}$ is at a logical low voltage level, at the next falling edge of the output signal A from the sync separator 10, where the output signal A transitions from a logical high voltage level to a logical low voltage level, the output signal C will rise to a logical high voltage level.

When the output signal C rises to a logical high voltage level, the transistor Q1 is turned on and provides a discharge path for the capacitor C1. Because the voltage level $V_{Cap}$ stored across the capacitor C1 is discharged below a level equal to 3,4 volts, the output $V_{Comp}$ of the comparator 20 transitions from a logical high voltage level to a logical low voltage level. Because the inverse output signal $\overline{A}$ is at a logical high voltage level the output of the logical NOR gate 22 remains at a logical low voltage level and the output Q of the RS latch 24 will remain at a logical high voltage level. The inverse output $\overline{Q}$ of the RS latch 24 will correspondingly remain at a logical low voltage level, causing the output signal C to remain at a logical high voltage level until the output signal A from the sync separator circuit 10 rises to a logical high voltage level.

When the output signal A from the sync separator circuit 10 rises to a logical high voltage level at the end of the synchronization pulse, the output signal C transitions from a logical high voltage level to a logical low voltage level. Because the RS latch 24 was previously set and has not yet been reset, the output signal C will transition when the output signal A from the sync separator circuit 10 transitions. Thus, the width of the pulses of the output signal C is equal to the width of the synchronization pulses from the output signal A.

When the output signal C falls to a logical low voltage level, the transistor Q1 is turned off and causes the voltage level $V_{Cap}$ stored across the capacitor C1 to be charged up again. When the voltage level $V_{Cap}$ stored across the capacitor C1 rises above the 3.4 volt threshold level the output $V_{Comp}$ of the comparator 20 will rise to a logical high voltage level again setting the RS latch 24. The output signal C will then rise to a logical high voltage level at the beginning of the next synchronization pulse from the output signal A and will fall to a logical low voltage level at the end of the next synchronization pulse.

The values of the capacitor C1 and the current source $I_o$ have been chosen such that during the horizontal period, the voltage level $V_{Cap}$ stored across the capacitor C1 will reach the 3.4 volt threshold level before every horizontal synchronization pulse and set the RS latch so that the output signal C will transition at the beginning of the next pulse. However, during the vertical blanking period, when the synchronization pulses have a frequency twice as fast as the horizontal synchronization pulses, when the capacitor C1 begins charging at the end of a pulse, the voltage level $V_{Cap}$ stored across the capacitor C1 will not reach the 3.4 volt threshold before the next pulse. Therefore, the RS latch 24 will not be set and the output signal C will not transition during that next pulse. However, the voltage level $V_{Cap}$ stored across the capacitor C1 will reach the 3.4 volt threshold level before the subsequent pulse, setting the RS latch 24 and allowing the output signal C to transition with the edges of that pulse.

The timing of the setting of the RS latch 24 is illustrated in FIG. 3. The time necessary for the voltage level $V_{Cap}$ stored across the capacitor C1 to reach the 3.4 volt threshold from a completely discharged level, is illustrated as the time period t1. The time between two equalization pulses during a vertical blanking period is illustrated as the time period t2. The values of the capacitor C1 and the current source $I_o$ have been chosen so that the time period t1 is greater than the time period t2, but less than the time between two horizontal synchronization pulses. Therefore, as described above, during the vertical blanking period every other pulse is ignored by the circuit of the present invention. In the preferred embodiment of the present invention, the capacitor C1 is implemented using a 20 picoFarad (pF) capacitor on the integrated circuit. Because the capacitor C1 is located on the integrated circuit no external pin is required to couple a capacitor for removing every other equalizing pulse. Preferably, the current source $I_o$ provides a current equal to 10 microAmps ($\mu$A).

In the manner as described above, the circuit of the present invention receives the output from the horizontal sync separator circuit 10 and outputs the output signal C which includes pulses representing each of the horizontal synchronization pulses and every other one of the sync pulses during the vertical blanking period. The output signal C controls the charging and discharging of the capacitor C1. The comparator 20 monitors the voltage level $V_{Cap}$ stored across the capacitor C1 to set the RS latch 24 when the voltage level $V_{Cap}$ rises above the 3.4 volt threshold level. When the RS latch 24 is set and the inverse output $\overline{Q}$ of the RS latch 24 is at a logical low voltage level, the output signal C will then transition at the edges of the next sync pulse.

Figure 4:
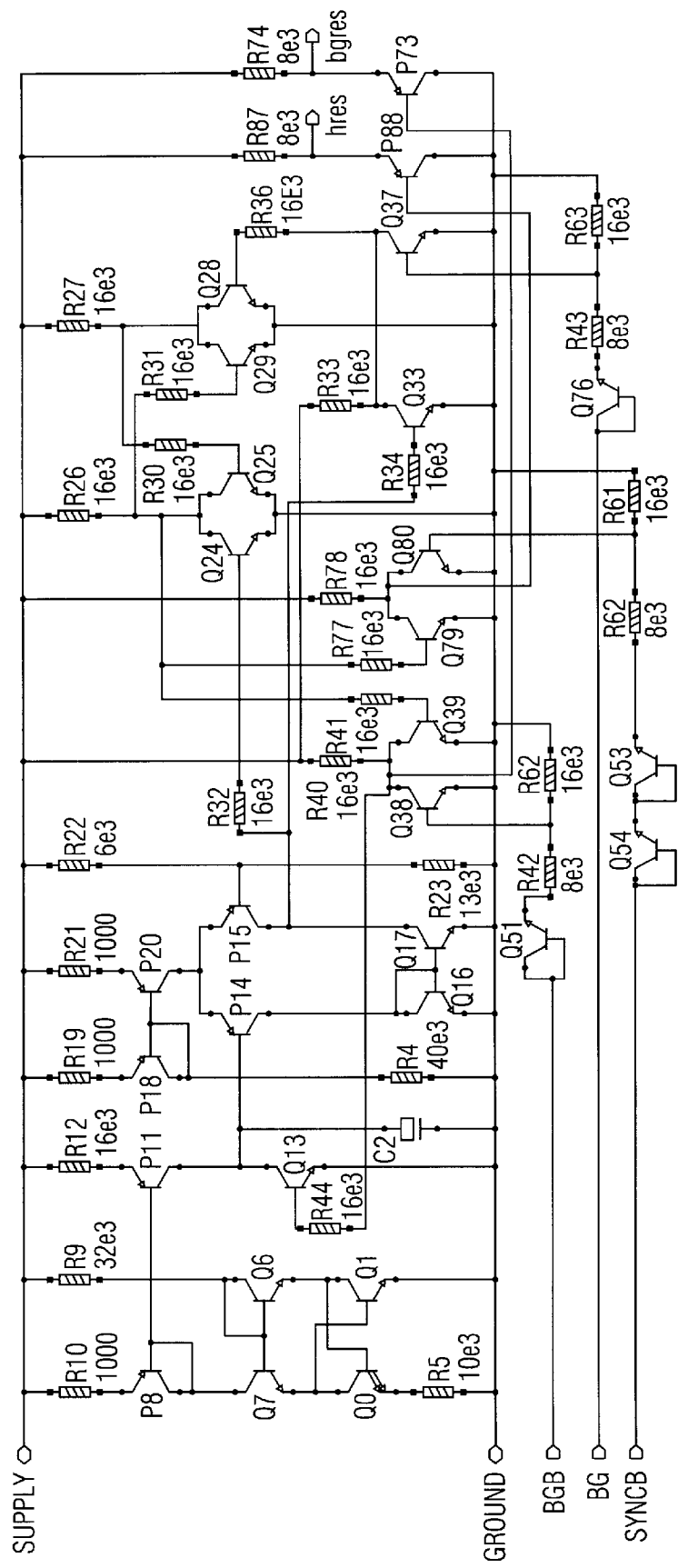
FIG. 4 illustrates a detailed schematic diagram of the circuit to remove every other equalizing pulse during the vertical blanking period.

A detailed circuit schematic of the preferred embodiment of the circuit to remove every other equalization pulse during the vertical blanking period is illustrated in FIG. 4. The preferred embodiment of the present invention is implemented within a video/graphics overlay integrated circuit, Part No. CXA2015Q, which will be available from Sony Corporation of America, 3300 Zanker Road, San Jose, Calif. 95134. Within this integrated circuit, a circuit to remove every other equalization pulse during the vertical blanking period is used to generate a horizontal reset signal which is provided to a digital encoder circuit. The output signal C is also provided to a horizontal phase-locked loop which locks the video system horizontally in phase with the synchronization signals.

While the preferred embodiment of the present invention has been illustrated and described as an integrated circuit using a bipolar transistor, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. An apparatus for generating an output signal representative of every horizontal synchronization pulse and every Nth vertical synchronization pulse within a composite video signal, wherein a first time period occurs between horizontal synchronization pulses and a second time period occurs between N vertical synchronization pulses, the apparatus comprising:
   a. a storage element for storing a level of charge;
   b. a charge supply circuit coupled to the storage element for raising the level of charge;
   c. a monitoring circuit coupled to the storage element for determining when the level of charge is above a threshold level, wherein the charge supply circuit will raise the level of charge above the threshold level in a third time period; and
   d. an output generating circuit coupled to the monitoring circuit for generating an output pulse signal representative of every horizontal synchronization pulse and every Nth vertical synchronization pulse, wherein the output pulse signal is only generated when the level of charge is above the threshold level and N is equal to two or more.

2. The apparatus as claimed in claim 1 wherein the third time period is less than the first time period but greater than the second time period such that the level of charge rises above the threshold level for generating the output pulse signal to correspond to every horizontal synchronization pulse and every Nth vertical synchronization pulse within the composite video signal.

3. An apparatus for generating an output signal representative of every horizontal synchronization pulse and every other vertical synchronization pulse within a composite video signal, wherein a first time period occurs between horizontal synchronization pulses and a second time period occurs between vertical synchronization pulses, the apparatus comprising:
   a. a storage element for storing a level of charge;
   b. a charge supply circuit coupled to the storage element for raising the level of charge;
   c. a monitoring circuit coupled to the storage element for determining when the level of charge is above a predetermined threshold level, wherein the charge supply circuit will raise the level of charge above the predetermined threshold level in a third time period; and
   d. an output generating circuit coupled to the monitoring circuit for generating an output pulse signal representative of every horizontal synchronization pulse and every other vertical synchronization pulse, wherein the output pulse signal is only generated when the level of charge is above the predetermined threshold level.

4. The apparatus as claimed in claim 3 wherein the third time period is less than the first time period but greater than the second time period such that the level of charge rises above the predetermined threshold level for generating the output pulse signal to correspond to every horizontal synchronization pulse and every other vertical synchronization pulse within the composite video signal.

5. The apparatus as claimed in claim 4 further comprising a receiving circuit configured for receiving a signal representative of all synchronization pulses within a composite video signal.

6. The apparatus as claimed in claim 5 wherein the vertical synchronization pulses include equalizing pulses and serration pulses included within a vertical blanking period of the composite video signal.

7. The apparatus as claimed in claim 6 wherein the storage element is a capacitor.

8. The apparatus as claimed in claim 7 wherein the first time period is twice as long as the second time period.

9. The apparatus as claimed in claim 8 wherein the apparatus is included within an integrated circuit and the capacitor is also included within the integrated circuit.

10. The apparatus as claimed in claim 9 wherein the output pulse signal is coupled as a feedback signal to control the charge supply circuit.

11. A method of generating an output signal representative of every horizontal synchronization pulse and every other vertical synchronization pulse within a vertical blanking period, wherein the vertical synchronization pulses include equalizing pulses and serration pulses included within a vertical blanking period of a composite video signal, the method comprising the steps of:
   a. receiving a signal representative of all synchronization pulses within a composite video signal, including horizontal and vertical synchronization pulses;
   b. generating an output signal representative of synchronization pulses within the signal, the output signal having a logical low voltage level and a logical high voltage level;
   c. raising a level of charge stored across a storage element when the output signal is at the logical low voltage level;
   d. discharging a level of charge stored across the storage element when the output signal rises to the logical high voltage level;
wherein the step of generating is only enabled when the level of charge is above a predetermined threshold level, further wherein the level of charge rises above the predetermined threshold level to enable the step of generating to include within the output signal pulses representative of every horizontal synchronization pulse and every other vertical synchronization pulse.

12. The method as claimed in claim 11 wherein the horizontal synchronization pulses have a first frequency and the vertical synchronization pulses have a second frequency.

13. An apparatus for generating an output signal representative of every horizontal synchronization pulse and every other vertical synchronization pulse, during a vertical blanking period, within a composite video signal, wherein the vertical synchronization pulses include equalizing pulses and serration pulses included within a vertical blanking period of a composite video signal and further wherein the horizontal synchronization pulses have a first frequency and the vertical synchronization pulses have a second frequency, the apparatus comprising:

a. a receiving circuit configured for receiving a signal representative of all synchronization pulses within a composite video signal, including horizontal and vertical synchronization pulses;

b. a capacitor for storing a level of charge;

c. a charging and discharging circuit coupled to the capacitor for raising and lowering the level of charge;

d. a monitoring circuit coupled to the capacitor for determining when the level of charge is above a predetermined threshold level;

e. an output generating circuit for generating an output signal representative of synchronization pulses within the composite video signal; and f. an output enabling circuit coupled to the monitoring circuit and to the output generating circuit for only enabling the output generating circuit when the level of charge is above the predetermined threshold level, wherein the level of charge rises above the predetermined threshold level to enable the output generating circuit to include within the output signal pulses representative of every horizontal synchronization pulse and every other vertical synchronization pulse.

14. The apparatus as claimed in claim 13 wherein the signal representative of the synchronization pulses of a composite video signal is received from a sync separator circuit.

15. The apparatus as claimed in claim 14 wherein the second frequency is double the first frequency.

16. The apparatus as claimed in claim 15 wherein the apparatus is included within an integrated circuit and the capacitor is also included within the integrated circuit.

17. The apparatus as claimed in claim 16 wherein the output signal is coupled as a feedback signal to control the charging and discharging circuit.

18. The apparatus as claimed in claim 17 wherein the monitoring circuit includes a comparator.

19. The apparatus as claimed in claim 18 wherein the predetermined threshold level is equal to 3.4 volts.

\* \* \* \* \*

UNITED STATES PATENT AND TRADEMARK OFFICE
CERTIFICATE OF CORRECTION

PATENT NO. : 5,774,185

DATED : June 30, 1998

INVENTOR(S) : Mehrdad Nayebi, et al.

It is certified that error appears in the above-identified patent and that said Letters Patent is hereby corrected as shown below:

In column 4, line 36, delete "$V_{camp}$" and insert --$V_{cap}$--.

In column 5, line 67, delete "level again" and insert --level, again--

Signed and Sealed this

Twenty-second Day of September, 1998

Attest:

BRUCE LEHMAN

Attesting Officer     Commissioner of Patents and Trademarks